US012601310B2

(12) United States Patent
Knoebel et al.

(10) Patent No.: US 12,601,310 B2
(45) Date of Patent: Apr. 14, 2026

(54) PISTON CYLINDER SYSTEM AND METHOD

(71) Applicant: INNIO Waukesha Gas Engines Inc., Waukesha, WI (US)

(72) Inventors: Phillip J. Knoebel, Hartland, WI (US); Jeffrey S. Jagusch, Waukesha, WI (US)

(73) Assignee: Innio Waukesha Gas Engines Inc., Waukesha, WI (US)

( * ) Notice: Subject to any disclaimer, the term of this patent is extended or adjusted under 35 U.S.C. 154(b) by 0 days.

(21) Appl. No.: 18/900,472

(22) Filed: Sep. 27, 2024

(65) Prior Publication Data

US 2026/0092574 A1 Apr. 2, 2026

(51) Int. Cl.
*F02F 11/00* (2006.01)

(52) U.S. Cl.
CPC .......... *F02F 11/005* (2013.01); *F02F 11/002* (2013.01)

(58) Field of Classification Search
CPC ...... F02F 11/00; F02F 11/005; F16J 15/0818; F16J 15/123
USPC .............................. 123/193.3; 277/591, 594
See application file for complete search history.

(56) References Cited

U.S. PATENT DOCUMENTS

| | | | | |
|---|---|---|---|---|
| 9,347,859 | B2 | 5/2016 | Anderson et al. | |
| 9,856,823 | B2 | 1/2018 | Chittenden | |
| 2003/0011137 | A1 | 1/2003 | Dubose | |
| 2011/0139113 | A1* | 6/2011 | Miller | F16J 10/04 123/193.2 |
| 2015/0168273 | A1 | 6/2015 | Anderson et al. | |

FOREIGN PATENT DOCUMENTS

| | | | | | |
|---|---|---|---|---|---|
| CN | 2665549 | Y | * | 12/2004 | |
| CN | 205225473 | U | | 5/2016 | |
| DE | 4342183 | A1 | * | 6/1995 | F02F 11/002 |
| DE | 102019122743 | A1 | * | 10/2019 | F16J 10/04 |
| FR | 1599503 | A | | 7/1970 | |
| JP | S58210342 | A | | 12/1983 | |
| JP | S6117448 | U | | 1/1986 | |
| JP | H03175135 | A | * | 7/1991 | |
| KR | 100217470 | B1 | | 6/1999 | |
| WO | 03085294 | A1 | | 10/2003 | |

OTHER PUBLICATIONS

DE 4342183 English Translation (Year: 1995).*
PCT International Search Report and Written Opinion; Application No. PCT/US25/047799, dated Jan. 2, 2026, 14 pgs.

* cited by examiner

*Primary Examiner* — George C Jin
*Assistant Examiner* — Teuta B Holbrook
(74) *Attorney, Agent, or Firm* — Fletcher Yoder, P.C.

(57) ABSTRACT

A system includes a block having a cylinder, a cylinder head, a cylinder liner, and a gasket. The cylinder liner includes a recess formed into a top surface of the cylinder liner. The cylinder liner is configured to line the cylinder about a piston. The gasket is disposed in the recess between the cylinder head and the cylinder liner. The recess includes a bottom surface. At least a portion of the bottom surface includes a tapered portion and a depth of the tapered portion increases along an inward radial direction of the cylinder liner.

20 Claims, 6 Drawing Sheets

PISTON CYLINDER SYSTEM AND METHOD

STATEMENT REGARDING FEDERALLY SPONSORED RESEARCH & DEVELOPMENT

This invention was made with Government support under contract number DE-AR0001531 awarded by the Department of Energy (DOE). The Government has certain rights in the invention.

BACKGROUND

The subject matter disclosed herein relates to reciprocating piston-cylinder assembly and, more specifically, to cylinder liner and associated gasket.

Piston-cylinder assemblies are used in a variety of machines, such as pumps, compressors, and internal combustion engines. For example, in an internal combustion engine, a cylinder liner may be disposed in a cylinder of an engine block, and a cylinder head may be coupled to the engine block over the cylinder and cylinder liner. Unfortunately, a crevice volume between the cylinder head and a top of the cylinder liner is a cause of unburned fuel emissions. Accordingly, a need exists for reducing unburned fuel emissions from cylinders due to the crevice volume between the cylinder head and the cylinder liner.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the present disclosure. Indeed, the present disclosure may encompass a variety of forms that may be similar to or different from the embodiments set forth below.

In an embodiment, a system includes a block having a cylinder, a cylinder head, a cylinder liner, and a gasket. The cylinder liner includes a recess formed into a top surface of the cylinder liner. The cylinder liner is configured to line the cylinder about a piston. The gasket is disposed between the cylinder head and the cylinder liner. The recess includes a bottom surface. At least a portion of the bottom surface includes a tapered portion and a depth of the tapered portion increases along an inward radial direction of the cylinder liner.

In another embodiment, a system includes a cylinder liner having a recess formed into a top surface of the cylinder liner. The cylinder liner is configured to line a cylinder about a piston. The recess includes a bottom surface, at least a portion of the bottom surface includes a tapered portion, and a depth of the tapered portion increases toward an inner radial surface of the cylinder liner.

In another embodiment, a method includes inserting a gasket into a recess formed into a top surface of a cylinder liner. The cylinder liner is configured to line a cylinder about a piston. The method also includes mounting a cylinder head over the gasket and a top portion of the cylinder liner. The method also includes applying a clamp load to the cylinder head. At least a portion of the clamp load is transmitted through an outer radial portion of the gasket to the cylinder. The recess includes a bottom surface, at least a portion of the bottom surface includes a tapered portion, and a depth of the tapered portion increases toward an inner radial surface of the cylinder liner.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments provide systems and methods for joining a cylinder head (e.g., piston cylinder head) to a cylinder (e.g., piston cylinder) in a manner that reduces a head gasket crevice volume (e.g., crevice volume) without applying a torque to a cylinder liner disposed within the cylinder. The head gasket crevice volume is a volume within the combustion chamber that can fill with unburned fuel and air during the compression stroke, and has an opening small enough to prevent the flame from propagating inside the crevice volume. As described herein, a system (e.g., piston-cylinder assembly) includes a cylinder, a cylinder head, a cylinder liner, and a gasket. The cylinder liner includes a recess formed into a top surface of the cylinder liner. The gasket is disposed in the recess between the cylinder head and the cylinder liner. At least a portion of a bottom surface of the recess is tapered, such that a depth of the taper increases along an inward radial direction of the cylinder liner. A bottom surface of the gasket is substantially orthogonal to a central axis of the gasket (e.g., flat annular gasket), such that a small gap forms beneath an inner radial portion of the gasket and above the tapered portion of the bottom surface the recess. It may be appreciated that when a clamping force is applied to the cylinder head, a majority of the clamping force is transmitted through an outer radial portion of the gasket and through an overhang portion of the cylinder liner. By concentrating the clamp load on the overhang portion of the cylinder liner, the amount of torque applied by the clamp load onto the cylinder liner is mitigated.

Figure 1:
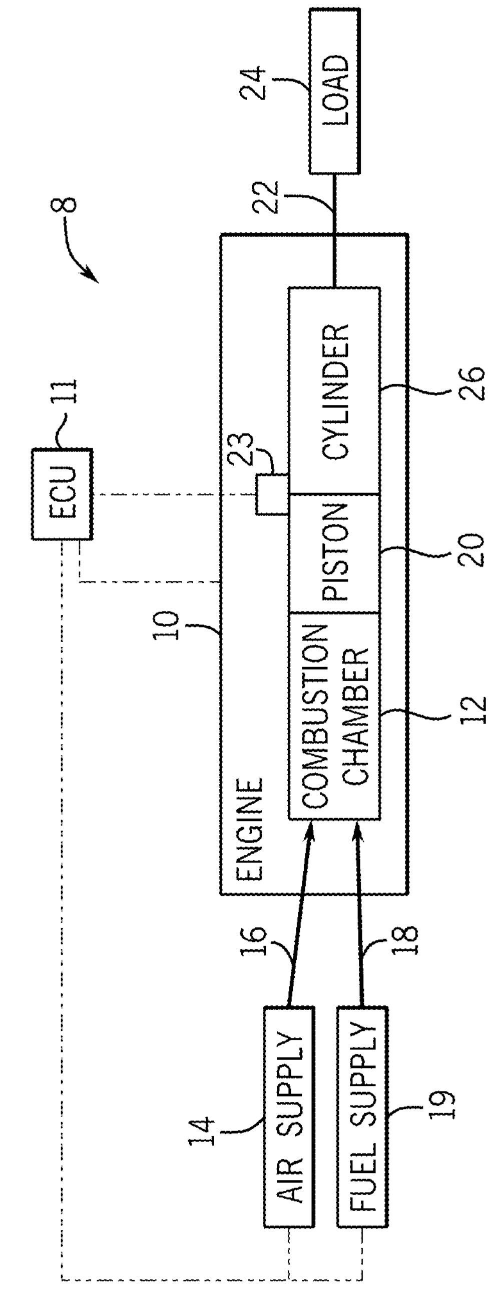
FIG. 1 is a schematic of an embodiment of a reciprocating engine coupled to a load in accordance with aspects of the present disclosure.

Turning to the drawings, FIG. 1 is a schematic of an embodiment of a reciprocating piston system 8. In certain embodiments, the reciprocating piston system 8 includes an engine 10 (e.g., a reciprocating piston-cylinder internal combustion engine or reciprocating engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. Any suitable oxidant may be used with the disclosed embodiments. The combustion chamber 12 is also configured to receive a fuel 18 (e.g., a liquid and/or gaseous fuel) from a fuel supply 19, and a fuel-air mixture ignites and combusts within each combustion chamber 12. The fuel 18 may be any suitable gaseous fuel, such as natural gas, associated petroleum gas, propane, biogas, sewage gas, landfill gas, coal mine gas, for example. In certain embodiments, the fuel 18 may be a liquid fuel (e.g., gasoline, diesel fuel, etc.). The hot pressurized combustion gases cause a piston 20 adjacent to each combustion chamber 12 to reciprocate linearly or axially within a cylinder 26 and convert pressure exerted by the combustion gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator, a compressor, a pump, or other machinery.

The reciprocating piston system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the reciprocating piston system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5 centimeters (cm)-1.5 meters (m). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. In certain embodiments, the engines 10 may include Jenbacher Engines (e.g., Jenbacher Type 3, Type 4, Type 6 or J920 FleXtra) or Waukesha Engines (e.g., Waukesha VGF, VHP, APG, 275GL) made by INNIO of Jenbach, Austria.

The reciprocating piston system 8 may include one or more sensors 23 communicatively coupled to an engine control unit (ECU) or controller 11. The sensors 23 may include temperature sensors, pressure sensors, flow rate sensors, fuel composition sensors, knock sensors, oxygen sensors, emissions sensors, or any combination thereof. For example, the knock sensors are suitable for detecting engine "knock." The emissions sensors may include nitrogen oxide (NOx) sensors, carbon oxide ($CO_X$) sensors, sulfur oxide ($SO_X$) sensors, or any combination thereof. The temperature, pressure, and flow rate sensors may be configured to monitor the temperature, pressure, and flow rate of a coolant and/or lubricant through the engine 10, such as through the engine block, the valve head, the pistons 20 (e.g., through a cooling gallery in the pistons 20), or any combination thereof. During operation of the engine 10, signals from the sensors 23 are communicated to the controller 11 to evaluate various conditions of the engine 10 and adjust operating parameters of the engine 10, including but not limited to a coolant flow rate, a lubricant flow rate, a fuel injection quantity and/or timing, an ignition timing, a boost pressure of intake air into the engine 10, or any combination thereof.

Figure 2:
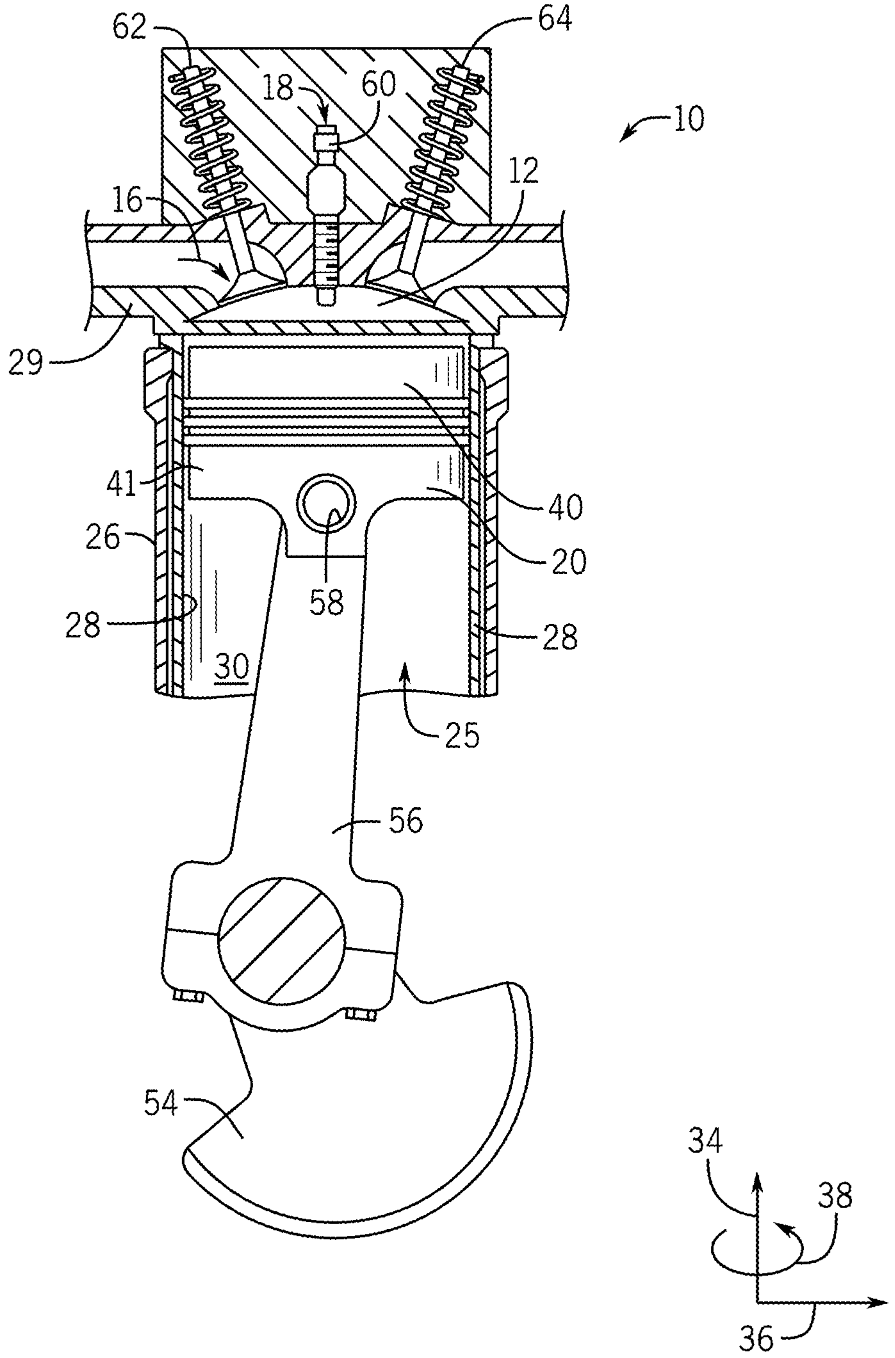
FIG. 2 is a cross-sectional side view of an embodiment of a piston-cylinder assembly of the reciprocating engine shown in FIG. 1 in accordance with aspects of the present disclosure.

FIG. 2 is a cross-sectional side view of an embodiment of the reciprocating piston system 8 of FIG. 1, illustrating a piston assembly 25 having a piston 20 disposed within a cylinder 26 (e.g., an engine cylinder within an engine block) of the engine 10. The cylinder 26 has a cylinder liner 28 defining a cylindrical cavity 30 (e.g., bore). The piston assembly 25 also includes a cylinder head 29 mounted on the cylinder liner 28 and the cylinder 26. The piston 20 may be defined by an axial axis or direction 34, a radial axis or direction 36, and a circumferential axis or direction 38. The piston 20 includes an upper or top portion 40 (e.g., a top land or crown portion). The top portion 40 generally blocks the fuel 18 and the air 16, or a fuel-air mixture, from escaping from the combustion chamber 12 during reciprocating motion of the piston 20. The piston 20 also includes a lower, bottom, or body portion 41 coupled to the top portion 40. Additionally, the coupling of the portions 40 and 41 of the piston 20 may help to define or form a cooling gallery in the piston 20. Either the cylinder liner 28 or the cylinder head 29 includes a tapered surface to help control a distribution of load of the cylinder head 29 on the cylinder liner 28 and reduce the possibility of leakage. As discussed herein, the cylinder liner 28 is described as including the tapered surface, however it should be recognized that the cylinder head 29 may include the tapered surface and the tapered surface may be omitted from the cylinder liner 28.

As shown, the piston 20 is attached to a crankshaft 54 via a connecting rod 56 and a pin 58. The crankshaft 54 converts the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, any suitable elements and/or techniques (e.g., carburetor) for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26. During operations, when the piston 20 is at the highest point in the cylinder 26, it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

Figure 3:
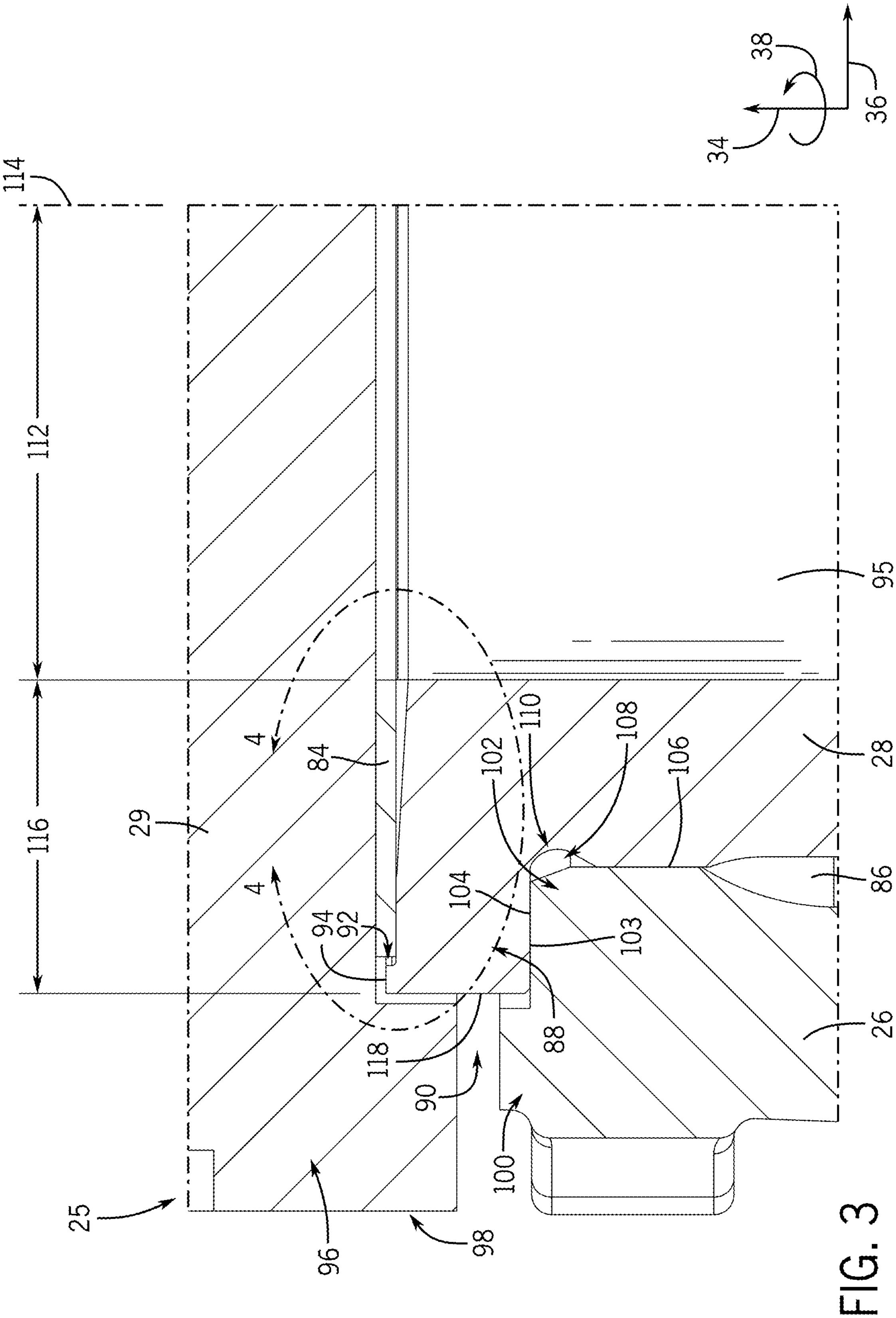
FIG. 3 is a side cross-sectional view of an embodiment of a portion of the piston-cylinder assembly of FIG. 2, further illustrating a cylinder liner and gasket in accordance with aspects of the present disclosure.

FIG. 3 is a side cross-sectional view of an embodiment of the reciprocating piston system 8 of FIG. 2. In the illustrated embodiment, the reciprocating piston system 8 includes the cylinder 26, the cylinder liner 28, the cylinder head 29, and a gasket 84 (e.g., head gasket). As discussed in detail below, a top flange of the cylinder liner 28 has a tapered surface that faces the gasket 84, while the gasket 84 has a generally flat annular profile without any taper. Thus, the tapered surface of the cylinder liner 28 helps to control a distribution of load and reduce risk of leakage. Also, the tapered surface is formed on the cylinder liner 28 rather than the gasket 84, which helps reduce costs as the cylinder liner 28 generally has a longer useful life than the gasket 84, whereas the simple flat annular profile of the gasket 84 helps to keep maintenance costs down as the gasket 84 may be more frequently changed. In certain embodiments, the cylinder head 29 may include the tapered surface and the tapered surface may be omitted from the cylinder liner 28.

As shown, the cylinder liner 28 is configured to line an interior surface 86 of the cylinder 26 about the piston. In the illustrated embodiment, the cylinder liner 28 includes a top flange or liner overhang portion 88 (e.g., annular flange, annular overhang portion, or annular overhang portion) disposed on an outer radial side 90 of the cylinder liner 28. Additionally, the cylinder liner 28 includes a recess 92 (e.g., annular recess) formed into a top surface 94 of the cylinder liner 28. In the illustrated embodiment, the recess 92 extends to an inner surface 95 (e.g., inner radial surface) of the cylinder liner 28. As shown, the gasket 84 is disposed in the recess 92 between the cylinder head 29 and the cylinder liner 28. In certain embodiments, the gasket 84 is composed of steel (e.g., carbon steel, stainless steel, alloy steel, etc.). Although the recess 92 is shown as being formed into the cylinder liner 28, in certain embodiments the recess 92 may be formed into the cylinder head 29 and may be omitted from the cylinder liner 28.

In the illustrated embodiment, the cylinder head 29 includes a cylinder head overhang portion 96 (e.g., overhang portion, annular overhang portion) disposed on an outer radial side 98 of the cylinder head 29. As shown, the cylinder head overhang portion 96 is disposed radially outward of the liner overhang portion 88. As shown, the cylinder 26 includes an outer ledge portion 100 (e.g., annular overhang portion, annular ledge portion, etc.) that is disposed radially outward of the liner overhang portion 88. Additionally, the cylinder 26 includes a support portion 102 (e.g., annular support ledge or shoulder) that is disposed beneath the liner overhang portion 88. As shown, a top surface 103 (e.g., annular surface) of the support portion 102 contacts a bottom surface 104 (e.g., annular surface) of the liner overhang portion 88. Additionally, in the illustrated embodiment, the cylinder head overhang portion 96 and/or the support portion 102 contacts an outer surface 106 of the cylinder liner 28.

As shown, the cylinder liner 28 includes a channel 108 (e.g., annular channel, recess, pocket, etc.) formed into an intersection 110 of the bottom surface 104 and the outer surface 106. As shown, the channel 108 is rounded in shape. The channel 108 extends radially inward past the outer surface 106 and, in certain embodiments, past the bottom surface 104. It may be appreciated that the channel 108 may reduce an amount of stress in an area of the intersection 110.

In certain embodiments, a first radial distance 112 that extends from a central axis 114 of the cylinder liner 28 to the inner surface 95 of the cylinder liner 28 is at least 70 millimeters (mm), 80 mm, 90 mm, 100 mm, 110 mm, 120 mm, 130 mm, 140 mm, or 150 mm. In certain embodiments the first radial distance 112 is between 110 mm and 160 mm, 120 mm and 150 mm, or 130 mm and 140 mm.

In certain embodiments, a top surface radial width 116 that extends from the inner surface 95 of the cylinder liner 28 to an overhang outer surface 118 of the overhang portion 88 is at least 10 mm, 20 mm, 30 mm, 40 mm or 50 mm. In certain embodiments, the top surface radial width 116 is between 10 mm and 60 mm, 20 mm and 50 mm, or 30 mm and 40 mm. However, the first radial distance 112 and the top surface radial width 116 may vary between embodiments of the cylinder liner 28 and the reciprocating piston system 8.

Figure 4:
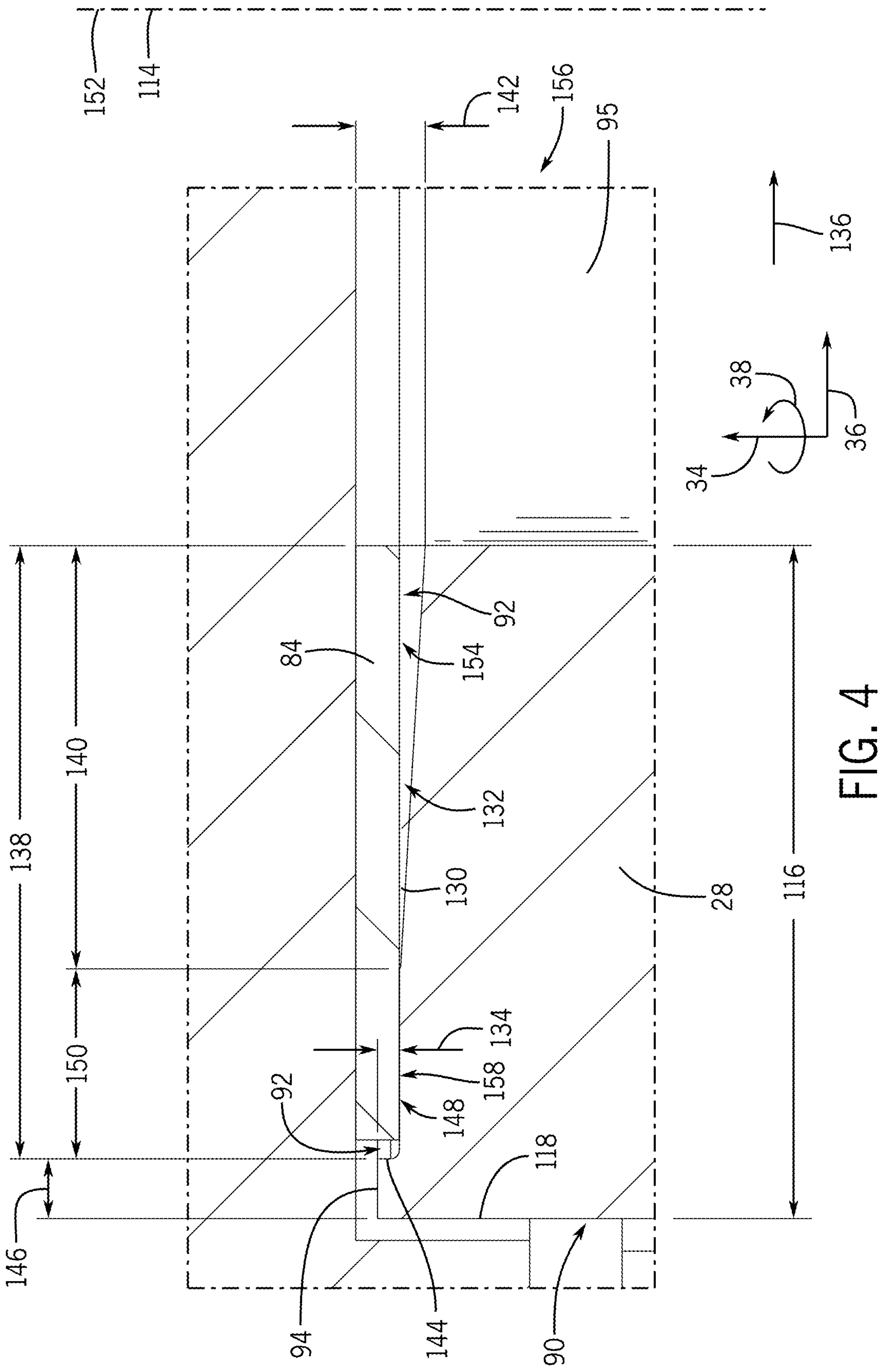
FIG. 4 is a close-up side cross-sectional view of an embodiment of a recess between the cylinder liner and the gasket of FIG. 3 within an area identified by line 4-4 in accordance with aspects of the present disclosure.

FIG. 4 is a close-up side cross-sectional view of an embodiment of the recess 92 of the cylinder liner 28 of FIG. 3 within an area identified by line 4-4. As shown, the recess 92 is formed into the top surface 94 of the cylinder liner 28. The recess 92 includes a bottom surface 130 that is vertically offset from the top surface 94. As shown, at least a portion of the bottom surface 130 includes a tapered portion 132 (e.g., tapered annular surface, tapered annular bottom surface, or frustoconical surface). Additionally or alternatively, the tapered portion 132 may include a curved surface (e.g., rounded portion, rounded frustoconical surface). A depth 134 of the tapered portion 132 relative to the top surface 94 increases along an inward radial direction 136 (e.g., radial direction 36) of the cylinder liner 28. Although the recess 92 is shown as being formed into the cylinder liner 28, in certain embodiments the recess 92 may be formed into the cylinder head 29 and may be omitted from the cylinder liner 28.

In the illustrated embodiment, the tapered portion 132 extends radially outward from the inner surface 95 toward the outer radial side 90 of the cylinder liner 28. As shown, the recess 92 has a recess radial width 138 and the tapered portion 132 has a tapered portion radial width 140. In certain embodiments, a ratio between the tapered portion radial width 140 and the recess radial width 138 is at least equal to or greater than 1:4, 1:3, 1:2, 3:5, or 3:4. In certain embodiments, the tapered portion 132 extends across the recess radial width 138. That is, in certain embodiments, the tapered portion 132 may extend across all of the recess radial width 138. In certain embodiments, a ratio between the recess radial width 138 and the top surface radial width 116 is at least equal to or greater than 1:3, 1:2, 3:5, 3:4, or 4:5.

In the illustrated embodiment, the recess 92 has an inner recess depth 142 that spans from the top surface 94 to the bottom surface 130 of the recess 92 along the inner surface 95 of the cylinder liner 28. In certain embodiments, the inner recess depth 142 is less than or equal to 1 mm, 0.9 mm, 0.8 mm, 0.7 mm, 0.6 mm, 0.5 mm, 0.4 mm, 0.3 mm, 0.2 mm, or 0.1 mm. In certain embodiments, a ratio between the inner recess depth 142 and the recess radial width 138 is less than or equal to 1:10, 2:25, 3:50, 1:25, 1:50, or 1:100. In certain embodiments, the ratio between the inner recess depth 142 and the recess radial width 138 ranges from 1:300 to 1:150, 1:250 to 1:175, or 1:225 to 1:180.

In the illustrated embodiment, an outer recess surface 144 of the recess is offset radially inward from the overhang outer surface 118. In certain embodiments the radial width 146 spanning from the outer recess surface 144 and the overhang outer surface 118 is at least equal to or greater than 2 mm, 4 mm, 6 mm, 8 mm, 10 mm, 12 mm, or 14 mm. In certain embodiments, a ratio between the radial width 146 and the top surface radial width 116 is at least equal to or greater than 1:50, 1:10, 1:6, 1:5, or 2:5. In certain embodiments, the ratio between the radial width 146 and the top surface radial width 116 is between 21:62 and 25:62.

In the illustrated embodiment, the bottom surface 130 of the recess 92 includes a flat portion 148 that is not tapered. That is, the bottom surface 130 includes a flat portion 148 that is substantially parallel to the radial axis 36 and substantially perpendicular to the axial axis 34 (e.g., orthogonal to the central axis 114 of the cylinder liner 28). In certain embodiments, a ratio between a flat radial width 150 of the flat portion 148 is less than or equal to 15 mm, 10 mm, 8 mm, 5 mm, or 2 mm. In certain embodiments, a ratio between the flat radial width 150 and the recess radial width 138 of the recess 92 is less than or equal to 1:2, 1:4, 1:5, or 1:6. In certain embodiments, the flat portion 148 is omitted.

In the illustrated embodiment, the gasket 84 is a flat annular gasket without any tapered surface. That is, a gasket top surface 148 (e.g., annular top surface) of the gasket 84 and a gasket bottom surface 150 (e.g., annular bottom surface) of the gasket 84 are orthogonal to a central axis 152 of the gasket 84 and/or the central axis 114 of the cylinder liner 28. In certain embodiments, a gap 154 may be present below the gasket bottom surface 150 and above the bottom surface 130 of the recess 92 on an inner radial side 156 of the recess 92. It may be appreciated that the tapered portion 132 may enable a load exerted by the cylinder head 29 onto the cylinder 26 to be transmitted through an outer radial portion 158 of the gasket 84 and the liner overhang portion 88 of the cylinder liner 28.

Figure 5:
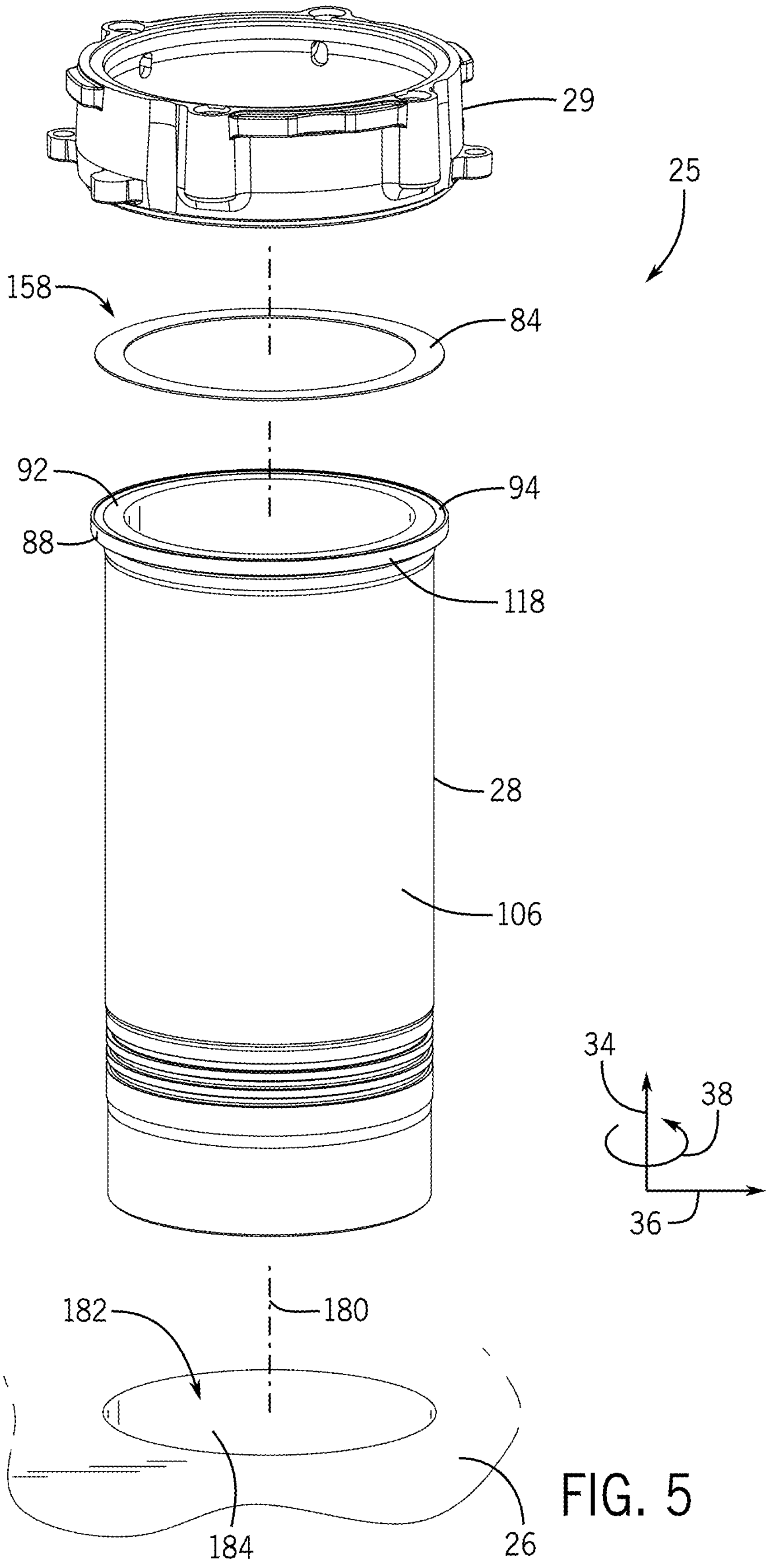
FIG. 5 is an exploded view of the piston-cylinder assembly of FIG. 2, further illustrating the cylinder liner and gasket in accordance with aspects of the present disclosure.

FIG. 5 is an exploded perspective view of the reciprocating piston system 8 of FIGS. 1-4, further illustrating details of the cylinder liner 28 and the gasket 84. In the illustrated embodiment, the reciprocating piston system 8 includes the cylinder head 29, the gasket 84, the cylinder liner 28, and the cylinder 26. As shown, the cylinder head 29, the gasket 84, the cylinder liner 28, and the cylinder 26 are substantially annular in shape and share a common central axis 180. As shown, the cylinder liner 28 is configured to be inserted into an interior 182 of the cylinder 26, such that the outer surface 106 of the cylinder liner 28 contacts an inner surface 184 of the cylinder 26. The gasket 84 is configured to be inserted into the recess 92 formed into the top surface 94 of the cylinder liner 28. The cylinder head 29 is configured to slide over (e.g., cover) the gasket 84 and the overhang portion 88 of the cylinder liner 28. The cylinder head 29 is configured to contact the gasket top surface 148 of the gasket 84 and, in certain embodiments, the top surface 94 and the overhang outer surface 118 of the cylinder liner 28. As discussed herein, it may be appreciated that the clamping load exerted by the cylinder head 29 onto the cylinder 26 is transmitted through an outer radial portion 158 of the gasket 84, as well as through the overhang portion 88 of the cylinder liner 28.

In certain embodiments, a majority of the clamping load exerted by the cylinder head 29 onto the cylinder 26 may be transmitted through an outer radial portion 158 of the gasket 84, as well as through the overhang portion 88 of the cylinder liner 28. Although dimensions associated with the cylinder liner 28 and/or the gasket 84 are provided herein, it may be appreciated that the piston assembly 25 may be used for any size of cylinder liner 28, gasket 84, cylinder 26, and/or cylinder head 29.

Figure 6:
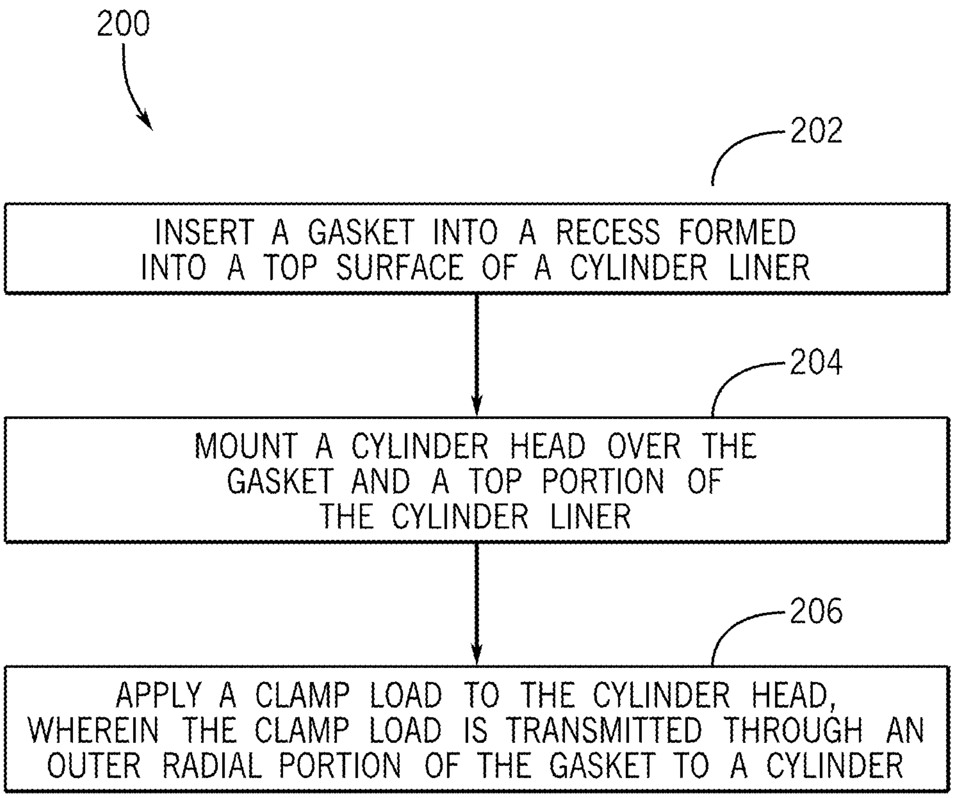
FIG. 6 is a flowchart showing an embodiment of a process for assembling the piston-cylinder assembly of FIG. 5 in accordance with aspects of the present disclosure.

FIG. 6 is a flowchart showing an embodiment of a process 200 for assembling the reciprocating piston system 8 of FIGS. 1-5. The blocks of the process 200 may be performed in the order disclosed herein or in any other suitable order. For example, certain blocks of the process 200 may be performed concurrently. In addition, in certain embodiments, at least one of the blocks of the process 200 may be omitted.

In block 202 of the process 200, a gasket is inserted into a recess formed into a top surface of a cylinder liner or the cylinder head. The cylinder liner is configured to line a cylinder about a piston. At least a portion of a bottom surface of the recess includes a tapered portion. A depth of the tapered portion increases toward an inner radial surface of the cylinder liner. The gasket includes a gasket top surface and a gasket bottom surface. The gasket bottom surface is substantially orthogonal to a central axis of the gasket. In certain embodiments, the gasket top surface is substantially orthogonal to a central axis of the gasket.

In block 204 of the process 200, a cylinder head is mounted over the gasket and a top portion of the cylinder liner. The cylinder head contacts the gasket top surface and, in certain embodiments, with a top surface of the cylinder liner. An outer radial portion of the cylinder head is disposed radially outward of an overhang portion of the cylinder liner when the cylinder head is positioned over the cylinder liner.

In block 206 of the process 200, a clamp load (e.g., via a plurality of threaded fasteners or bolts) is applied to the cylinder head to secure the cylinder head to the cylinder. The clamp load is transmitted through an outer radial portion of the gasket and through the overhang portion of the cylinder liner to the cylinder. In certain embodiments, the clamp load may be applied via one or more threaded fasteners (e.g., bolts or screws).

Technical effects of the disclosed embodiments include systems and methods for joining a cylinder head to a cylinder. The recess formed into the top surface of the cylinder liner is configured to receive a gasket having a flat bottom surface. The tapered portion of the bottom surface of the recess forms a gap with the bottom surface of the gasket on an inner radial side of the recess. The combination of a flat gasket and a recess having a tapered bottom surface enables a clamping load applied to the cylinder head to be applied to an outer portion of the cylinder liner, thereby avoiding imparting a large torque on the cylinder liner. Additional technical effects include reducing cost of the gasket, which is replaced more frequently than the cylinder liner, and reducing the head gasket crevice volume, thereby reducing unburned fuel emissions (e.g., methane slip) by approximately 30 percent.

The subject matter described in detail above may be defined by one or more clauses, as set forth below.

According to a first aspect, a system includes a block having a cylinder, a cylinder head, a cylinder liner, and a gasket. The cylinder liner includes a recess formed into a top surface of the cylinder liner. The cylinder liner is configured to line the cylinder about a piston. The gasket is disposed in the recess between the cylinder head and the cylinder liner.

The recess includes a bottom surface. At least a portion of the bottom surface includes a tapered portion and a depth of the tapered portion increases along an inward radial direction of the cylinder liner.

The system of the preceding clause, wherein the recess extends to an inner radial surface of the cylinder liner.

The system of any preceding clause, wherein a ratio between a radial width of the tapered portion and a radial width of the recess is at least 1:2.

The system of any preceding clause, wherein a ratio between the radial width of the recess and a radial width of the top surface of the cylinder liner at least 3:5.

The system of any preceding clause, wherein a ratio of the depth of the recess at the inner radial surface and the radial width of the recess is less than 1:50.

The system of any preceding clause, wherein the bottom surface includes a flat portion, wherein a ratio of a radial width of the flat portion to the radial width of the recess is less than 1:2.

The system of any preceding clause, wherein the cylinder liner includes an overhang portion disposed on an outer radial side of the cylinder liner, and a top surface of the cylinder is configured to contact a bottom surface of the overhang portion.

The system of any preceding clause, wherein the cylinder liner includes a channel at an intersection of the bottom surface of the overhang portion and an outer radial surface of the cylinder liner.

The system of any preceding clause, wherein the bottom surface of the recess is offset from the top surface of the cylinder liner.

The system of any preceding clause, wherein an outer radial surface of the recess is offset from an outer radial surface of the cylinder liner.

The system of any preceding clause, wherein a bottom surface of the gasket is orthogonal to a central axis of the gasket.

The system of any preceding clause, wherein the gasket is comprised of steel.

According to a second aspect, a system includes a cylinder liner having a recess formed into a top surface of the cylinder liner. The cylinder liner is configured to line a cylinder about a piston. The recess includes a bottom surface, at least a portion of the bottom surface includes a tapered portion, and a depth of the tapered portion increases toward an inner radial surface of the cylinder liner.

The system of the preceding clause, wherein the recess is an annular recess, wherein the annular recess is configured to receive an annular gasket.

The system of any preceding clause, wherein a ratio between a radial width of the tapered portion and a radial width of the recess is at least 1:2.

The system of any preceding clause, wherein a ratio between the radial width of the recess and a radial width of the top surface of the cylinder liner at least 3:5.

The system of any preceding clause, wherein a ratio of the depth of the recess at the inner radial surface and the radial width of the recess is less than 1:50.

The system of any preceding clause, wherein the bottom surface includes a flat portion, wherein a ratio of a radial width of the flat portion to the radial width of the recess is less than 1:2.

According to a third aspect, a method includes inserting a gasket into a recess formed into a top surface of a cylinder liner. The cylinder liner is configured to line a cylinder about a piston. The method also includes mounting a cylinder head over the gasket and a top portion of the cylinder liner. The method also includes applying a clamp load to the cylinder head. At least a portion of the clamp load is transmitted through an outer radial portion of the gasket to the cylinder. The recess includes a bottom surface, at least a portion of the bottom surface includes a tapered portion, and a depth of the tapered portion increases toward an inner radial surface of the cylinder liner.

The method of the preceding clause, wherein a bottom surface of the gasket is orthogonal to a central axis of the gasket.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:

a block having a cylinder;

a cylinder head;

a cylinder liner comprising a recess formed into a top surface of the cylinder liner, wherein the cylinder liner is configured to line the cylinder about a piston; and a gasket disposed in the recess between the cylinder head and the cylinder liner, wherein a bottom surface of the gasket is orthogonal to a central axis of the gasket, and the bottom surface extends from an inner radial surface of the gasket to an outer radial surface of the gasket;

wherein the recess comprises an additional bottom surface, the additional bottom surface comprises:

a flat portion configured to engage the bottom surface of the gasket; and a tapered portion, wherein the tapered portion is tapered relative to the bottom surface;

wherein a gap is defined by the bottom surface and the tapered portion.

2. The system of claim 1, wherein the recess extends to an additional inner radial surface of the cylinder liner.

3. The system of claim 2, wherein a ratio between a radial width of the tapered portion and a radial width of the recess is at least 1:2.

4. The system of claim 3, wherein a ratio between the radial width of the recess and a radial width of the top surface of the cylinder liner is at least 3:5.

5. The system of claim 3, wherein a ratio of the depth of the recess at the additional inner radial surface and the radial width of the recess is less than 1:50.

6. The system of claim 3, wherein a ratio of a radial width of the flat portion to the radial width of the recess is less than 1:2.

7. The system of claim 1, wherein the cylinder liner comprises an overhang portion disposed on an outer radial side of the cylinder liner, and the top surface of the cylinder is configured to contact a bottom surface of the overhang portion.

8. The system of claim 7, wherein the cylinder liner comprises a channel at an intersection of the bottom surface of the overhang portion and an additional outer radial surface of the cylinder liner.

9. The system of claim 1, wherein the gasket is comprised of steel.

10. The system of claim 1, wherein a radial cross-section of the gasket is rectangular in shape, wherein a thickness of the gasket is uniform from the inner radial surface to the outer radial surface.

11. The system of claim 1, wherein an additional top surface of the gasket and the bottom surface are parallel to one another.

12. The system of claim 1, wherein the gap is axially disposed between the bottom surface and the tapered portion.

13. The system of claim 1, wherein a width of the gap is defined by a distance from the bottom surface to the tapered portion, and the width varies along a radial direction of the cylinder liner.

14. The system of claim 13, wherein the width increases along a radially inward direction of the cylinder liner.

15. A system, comprising:

a cylinder liner comprising a recess formed into a top surface of the cylinder liner, wherein the cylinder liner is configured to line a cylinder about a piston; and a gasket disposed in the recess, wherein a bottom surface of the gasket is orthogonal to a central axis of the gasket, and the bottom surface extends from an inner radial surface of the gasket to an outer radial surface of the gasket;

wherein the recess comprises an additional bottom surface, the additional bottom surface comprises:

a flat portion configured to engage the bottom surface of the gasket; and a tapered portion, wherein the tapered portion is tapered relative to the bottom surface;

wherein a gap is defined by the bottom surface and the tapered portion.

16. The system of claim 15, wherein a ratio between a radial width of the tapered portion and a radial width of the recess is at least 1:2.

17. The system of claim 16, wherein a ratio between the radial width of the recess and a radial width of the top surface of the cylinder liner is at least 3:5.

18. The system of claim 16, wherein a ratio of the depth of the recess at the inner radial surface and the radial width of the recess is less than 1:50.

19. The system of claim 16, wherein a ratio of a radial width of the flat portion to the radial width of the recess is less than 1:2.

20. A method, comprising:

inserting a gasket into a recess formed into a top surface of a cylinder liner, wherein the cylinder liner is configured to line a cylinder about a piston, wherein a bottom surface of the gasket is orthogonal to a central axis of the gasket, and the bottom surface extends from an inner radial surface of the gasket to an outer radial surface of the gasket;

mounting a cylinder head over the gasket and a top portion of the cylinder liner; and applying a clamp load to the cylinder head, wherein at least a portion of the clamp load is transmitted through an outer radial portion of the gasket to the cylinder;

wherein the recess comprises an additional bottom surface, the additional bottom surface comprises:

a flat portion configured to engage the bottom surface of the gasket; and a tapered portion, wherein the tapered portion is tapered relative to the bottom surface;

wherein a gap is defined by the bottom surface and the tapered portion.

* * * * *